United States Patent
Rabinowitz et al.

(10) Patent No.: US 7,372,405 B2
(45) Date of Patent: May 13, 2008

(54) POSITION LOCATION USING DIGITAL VIDEO BROADCAST TELEVISION SIGNALS

(75) Inventors: Matthew Rabinowitz, Portola Valley, CA (US); James J. Spilker, Jr., Woodside, CA (US)

(73) Assignee: Rosum Corporation, Mountain View, CA (US)

( * ) Notice: Subject to any disclaimer, the term of this patent is extended or adjusted under 35 U.S.C. 154(b) by 17 days.

(21) Appl. No.: 11/532,736

(22) Filed: Sep. 18, 2006

(65) Prior Publication Data

US 2007/0008220 A1    Jan. 11, 2007

Related U.S. Application Data

(63) Continuation of application No. 09/932,010, filed on Aug. 17, 2001, now Pat. No. 7,126,536, which is a continuation-in-part of application No. 09/887,158, filed on Jun. 21, 2001, now abandoned.

(60) Provisional application No. 60/265,675, filed on Feb. 2, 2001, provisional application No. 60/281,270, filed on Apr. 3, 2001, provisional application No. 60/281, 269, filed on Apr. 3, 2001, provisional application No. 60/293,812, filed on May 25, 2001, provisional application No. 60/293,813, filed on May 25, 2001, provisional application No. 60/293,646, filed on May 25, 2001.

(51) Int. Cl.
*G01S 3/02* (2006.01)

(52) U.S. Cl. ........................... 342/458; 342/464

(58) Field of Classification Search ............... 342/450, 342/453, 457–458, 463–465; 455/456.2, 455/456.3, 457
See application file for complete search history.

(56) References Cited

U.S. PATENT DOCUMENTS

| | | | |
|---|---|---|---|
| 4,700,306 | A | 10/1987 | Wallmander |
| 5,630,206 | A | 5/1997 | Urban et al. |
| 6,147,642 | A | 11/2000 | Perry et al. |
| 6,181,921 | B1 | 1/2001 | Konisi et al. |
| 6,184,921 | B1 | 2/2001 | Limberg |
| 6,201,497 | B1 | 3/2001 | Snyder et al. |
| 6,437,832 | B1 | 8/2002 | Grabb et al. |
| 6,522,297 | B1 | 2/2003 | Rabinowitz et al. |
| 6,559,800 | B2 | 5/2003 | Rabinowitz et al. |
| 6,646,603 | B2 | 11/2003 | Dooley et al. |

(Continued)

FOREIGN PATENT DOCUMENTS

DE    3242997 A1    5/1984

*Primary Examiner*—Dao Phan
(74) *Attorney, Agent, or Firm*—Richard A. Dunning, Jr.

(57) ABSTRACT

Apparatus to determine the position of a user terminal, the apparatus having corresponding methods and computer-readable media, comprises a receiver to receive, at the user terminal, a wireless orthogonal frequency-division multiplexing (OFDM) signal comprising a scattered pilot signal; and a processor to determine a pseudo-range based on the scattered pilot signal; wherein a position of the user terminal is determined based on the pseudo-range and a location of a transmitter of the OFDM signal.

22 Claims, 17 Drawing Sheets

U.S. PATENT DOCUMENTS

| | | |
|---|---|---|
| 6,717,547 B2 | 4/2004 | Spilker, Jr. et al. |
| 6,727,847 B2 | 4/2004 | Rabinowitz et al. |
| 6,753,812 B2 | 6/2004 | Rabinowitz et al. |
| 6,806,830 B2 | 10/2004 | Panasik et al. |
| 6,839,024 B2 | 1/2005 | Spilker, Jr. et al. |
| 6,859,173 B2 | 2/2005 | Spilker, Jr. et al. |
| 6,861,984 B2 | 3/2005 | Rabinowitz et al. |
| 6,879,286 B2 | 4/2005 | Rabinowitz et al. |
| 6,914,560 B2 | 7/2005 | Spilker, Jr. et al. |
| 6,917,328 B2 | 7/2005 | Rabinowitz et al. |
| 6,952,182 B2 | 10/2005 | Spilker, Jr. et al. |
| 6,961,020 B2 | 11/2005 | Robinowitz et al. |
| 6,963,306 B2 | 11/2005 | Spilker, Jr. |
| 6,970,132 B2 | 11/2005 | Spilker, Jr. |
| 7,042,396 B2 | 5/2006 | Omura et al. |
| 7,042,949 B1 | 5/2006 | Omura et al. |
| 7,126,536 B2 | 10/2006 | Rabinowitz et al. |
| 2007/0072621 A1* | 3/2007 | Mukkavilli et al. ...... 455/456.1 |

* cited by examiner 0, 48, 54, 87, 141, 156, 192, 201, 255, 279, 282, 333, 432, 450, 483, 525, 531, 618, 636, 714, 759, 765, 780, 804, 873, 888, 918, 939, 942, 969, 984, 1050, 1101, 1107, 1110, 1137, 1140, 1146, 1206, 1269, 1323, 1377, 1491, 1683, 1704, 1752, 1758, 1791, 1845, 1850, 1896, 1905, 1959, 1983, 1986, 2037, 2136, 2154, 2187, 2229, 2235, 2322, 2340, 2418, 2463, 2469, 2484, 2508, 2577, 2592, 2622, 2643, 2646, 2673, 2688, 2754, 2805, 2811, 2814, 2841, 2844, 2850, 2910, 2973, 3027, 3081, 3195, 3387, 3408, 3456, 3462, 3495, 3549, 3564, 3600, 3609, 3663, 3687, 3690, 3741, 3840, 3853, 3891, 3933, 3939, 4026, 4044, 4122, 4167, 4173, 4188, 4212, 4281, 4296, 4326, 4347, 4350, 4377, 4392, 4458, 4509, 4515, 4518, 4545, 4548, 4554, 4614, 4677, 4731, 4785, 4899, 5091, 5112, 5160, 5166, 5199, 5253, 5268, 5304, 5313, 5367, 5391, 5394, 5445, 5544, 5562, 5595, 5637, 5643, 5730, 5748, 5826, 5871, 5877, 5892, 5916, 5985, 6000, 6030, 6051, 6054, 6081, 6096, 6162, 6213, 6219, 6222, 6249, 6252, 6258, 6318, 6381, 6435, 6489, 6603, 6795, 6816

FIG. 7

POSITION LOCATION USING DIGITAL VIDEO BROADCAST TELEVISION SIGNALS

CROSS-REFERENCE TO RELATED APPLICATIONS

This application is a CONT of 09/932,010 Aug. 17, 2001, now U.S. Pat. No. 7,126,536
which is a CIP of Ser. No. 09/887,158 Jun. 21, 2001 ABN and which claims the benefit of 60/265,675 Feb. 02, 2001 and which claims the benefit of 60/281,270 Apr. 03, 2001 and which claims the benefit of 60/281,269 Apr. 03, 2001 and which claims the benefit of 60/293,812 May 25, 2001 and which claims the benefit of 60/293,813 May 25, 2001 and which claims the benefit of 60/293,646 May 25, 2001. This application is related to 60/737,027 Nov. 14, 2005.
The subject matter of all of the foregoing are incorporated herein by reference.

BACKGROUND

The present invention relates generally to position determination, and particularly to position determination using DTV signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

In general, in one aspect, the invention features an apparatus to determine the position of a user terminal, comprising: a receiver to receive, at the user terminal, a wireless orthogonal frequency-division multiplexing (OFDM) signal comprising a scattered pilot signal; and a processor to determine a pseudo-range based on the scattered pilot signal; wherein a position of the user terminal is determined based on the pseudo-range and a location of a transmitter of the OFDM signal.

In some embodiments, the OFDM signal comprises a Digital Video Broadcasting (DVB) signal. In some embodiments, the DVB signal comprises at least one of: a DVB-Terrestrial (DVB-T) signal; and a DVB-Handheld (DVB-H) signal. In some embodiments, the processor determines the position of the user terminal based on the pseudo-range and the location of the transmitter of the OFDM signal. In some embodiments, to determine the position of the user terminal, the processor determines an offset between a local time reference in the user terminal and a master time reference, and determines the position of the user terminal based on the wireless OFDM signal, the location of the transmitter of the OFDM signal, and the offset. In some embodiments, the processor determines a subsequent position of the user terminal using the offset.

In general, in one aspect, the invention features an apparatus to determine the position of a user terminal, comprising: receiver means for receiving, at the user terminal, a wireless orthogonal frequency-division multiplexing (OFDM) signal comprising a scattered pilot signal; and processor means for determining a pseudo-range based on the scattered pilot signal; wherein a position of the user terminal is determined based on the pseudo-range and a location of a transmitter of the OFDM signal.

In some embodiments, the OFDM signal comprises: a Digital Video Broadcasting (DVB) signal. In some embodiments, the DVB signal comprises at least one of: a DVB-Terrestrial (DVB-T) signal; and a DVB-Handheld (DVB-H) signal. In some embodiments, the processor means determines the position of the user terminal based on the pseudo-range and the location of the transmitter of the OFDM signal. In some embodiments, to determine the position of the user terminal, the processor means determines an offset between a local time reference in the user terminal and a master time reference, and determines the position of the user terminal based on the wireless OFDM signal, the location of the transmitter of the OFDM signal, and the offset. In some embodiments, the processor means determines a subsequent position of the user terminal using the offset.

In general, in one aspect, the invention features a method for determining the position of a user terminal, comprising: receiving, at the user terminal, a wireless orthogonal frequency-division multiplexing (OFDM) signal comprising a scattered pilot signal; and determining a pseudo-range based on the scattered pilot signal; wherein a position of the user terminal is determined based on the pseudo-range and a location of a transmitter of the OFDM signal.

In some embodiments, the OFDM signal comprises: a Digital Video Broadcasting (DVB) signal. In some embodiments, the DVB signal comprises at least one of: a DVB-Terrestrial (DVB-T) signal; and a DVB-Handheld (DVB-H) signal. Some embodiments comprise determining an offset between a local time reference in the user terminal and a master time reference; and determining the position of the user terminal based on the wireless OFDM signal, the location of the transmitter of the OFDM signal, and the offset. Some embodiments comprise determining a subsequent position of the user terminal using the offset.

In general, in one aspect, the invention features computer-readable media embodying instructions executable by a computer to perform a method for determining the position of a user terminal, the method comprising: receiving, at the user terminal, a wireless orthogonal frequency-division multiplexing (OFDM) signal comprising a scattered pilot signal; and determining a pseudo-range based on the scattered pilot signal; wherein a position of the user terminal is determined based on the pseudo-range and a location of a transmitter of the OFDM signal.

In some embodiments, the OFDM signal comprises: a Digital Video Broadcasting (DVB) signal. In some embodiments, the DVB signal comprises at least one of: a DVB-Terrestrial (DVB-T) signal; and a DVB-Handheld (DVB-H) signal. In some embodiments, the method further comprises: determining an offset between a local time reference in the user terminal and a master time reference; and determining the position of the user terminal based on the wireless OFDM signal, the location of the transmitter of the OFDM signal, and the offset. In some embodiments, the method further comprises: determining a subsequent position of the user terminal using the offset.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 shows the carrier numbers for the first 50 continuous pilot carriers.

Like reference symbols in the various drawings indicate like elements.

DETAILED DESCRIPTION

Introduction

Figure 1:
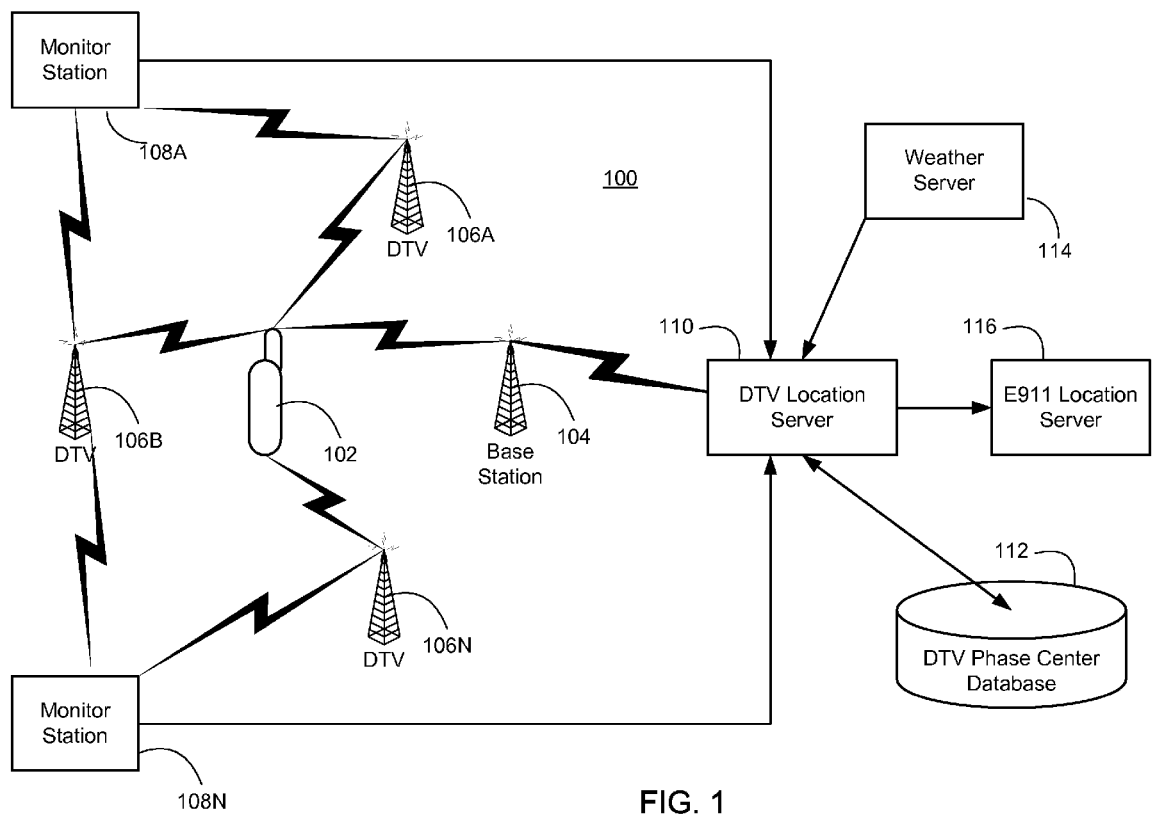
FIG. 1 depicts an implementation of the present invention including a user terminal that communicates over an air link with a base station.

Digital television (DTV) is growing in popularity. DTV was first implemented in the United States in 1998. As of the end of 2000, 167 stations were on the air broadcasting the DTV signal. As of Feb. 28, 2001, approximately 1200 DTV construction permits had been acted on by the FCC. According to the FCC's objective, all television transmission will soon be digital, and analog signals will be eliminated. Public broadcasting stations must be digital by May 1, 2002 in order to retain their licenses. Private stations must be digital by May 1, 2003. Over 1600 DTV transmitters are expected in the United States.

Other regions are implementing similar DTV systems. The European Telecommunications Standards Institute (ETSI) has defined a terrestrial DTV signal for Europe, referred to herein as the Digital Video Broadcasting-Terrestrial (DVB-T) signal. These new DTV signals permit multiple standard definition TV signals or even high definition signals to be transmitted in the assigned 8 MHz channel. These new DVB-TDTV signals are completely different from the analog NTSC TV signals, are transmitted on new 8 MHz frequency channels, and have completely new capabilities. The inventors have recognized that the DVB-T signal can be used for position location, and have developed techniques for doing so. These techniques are usable in the vicinity of DVB-T DTV transmitters with a range from the transmitter much wider than the typical DTV reception range. Because of the high power of the DTV signals, these techniques can even be used indoors by handheld receivers, and thus provide a possible solution to the position location needs of the Enhanced 911 (E911) system.

The techniques disclosed herein can be applied to other DTV signals that include known sequences of data by simply modifying the correlator to accommodate the known sequence of data, as would be apparent to one skilled in the relevant arts. These techniques can also be applied to a range of other orthogonal frequency-division multiplexing (OFDM) signals such as satellite radio signals.

In contrast to the digital pseudo-noise codes of GPS, the DTV signals are received from transmitters only a few miles distant, and the transmitters broadcast signals at levels up to the megawatt level. In addition the DTV antennas have significant antenna gain, on the order of 14 dB. Thus there is often sufficient power to permit DTV signal reception inside buildings.

As described below, implementations of the present invention utilize a component of the DVB-T signal that is referred to as the "scattered pilot signal." The use of the scattered pilot signal is advantageous for several reasons. First, it permits position determination indoors, and at great distances from DTV transmitters. Conventional DTV receivers utilize only one data signal at a time, and so are limited in range from the DTV transmitter by the energy of a single signal. In contrast, implementations of the present invention utilize the energy of multiple scattered pilot signals simultaneously, thereby permitting operation at greater range from DTV transmitters than conventional DTV receivers. Further, the scattered pilots are not modulated by data. This is advantageous for two reasons. First, all of the power in the scattered pilots is available for position determination; none of the power is devoted to data. Second, the scattered pilots can be observed for long periods of time without suffering the degradation that data modulation would produce. Thus the ability to track signals indoors at substantial range from the DTV tower is greatly expanded. Furthermore, through the use of digital signal processing it is possible to implement these new tracking techniques in a single semiconductor chip.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
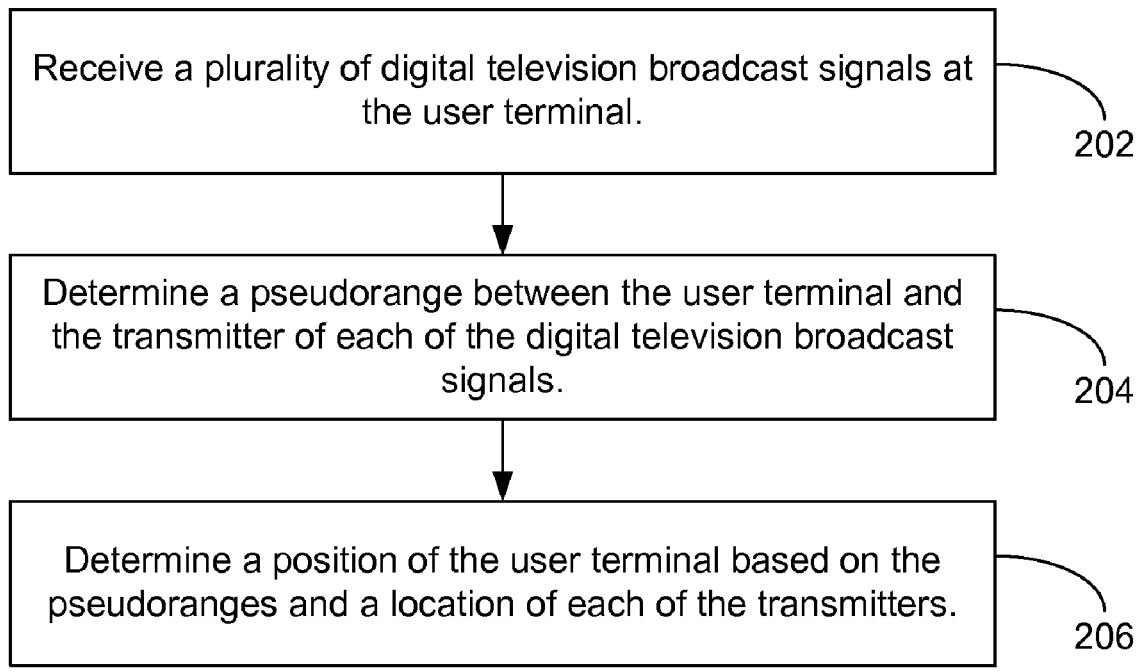
FIG. 2 illustrates an operation of an implementation of the invention.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing.

User terminal 102 determines a pseudo-range between the user terminal 102 and each DTV transmitter 106 (step 204). Each pseudo-range represents the time difference (or equivalent distance) between a time of transmission from a transmitter 108 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset} = a + b(t-T) + c(t-T)^2 \tag{1}$$

that can be described by a, b, c, and T. In either implementation, each measured time offset is transmitted periodically to the DTV location server using the Internet, a secured modem connection or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. In another implementation, the phase center of each DTV transmitter 106 is measured by surveying the antenna phase center.

In one implementation, DTV location server 110 receives weather information describing the air temperature, atmospheric pressure, and humidity in the vicinity of user terminal 102 from a weather server 114. The weather information is available from the Internet and other sources. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
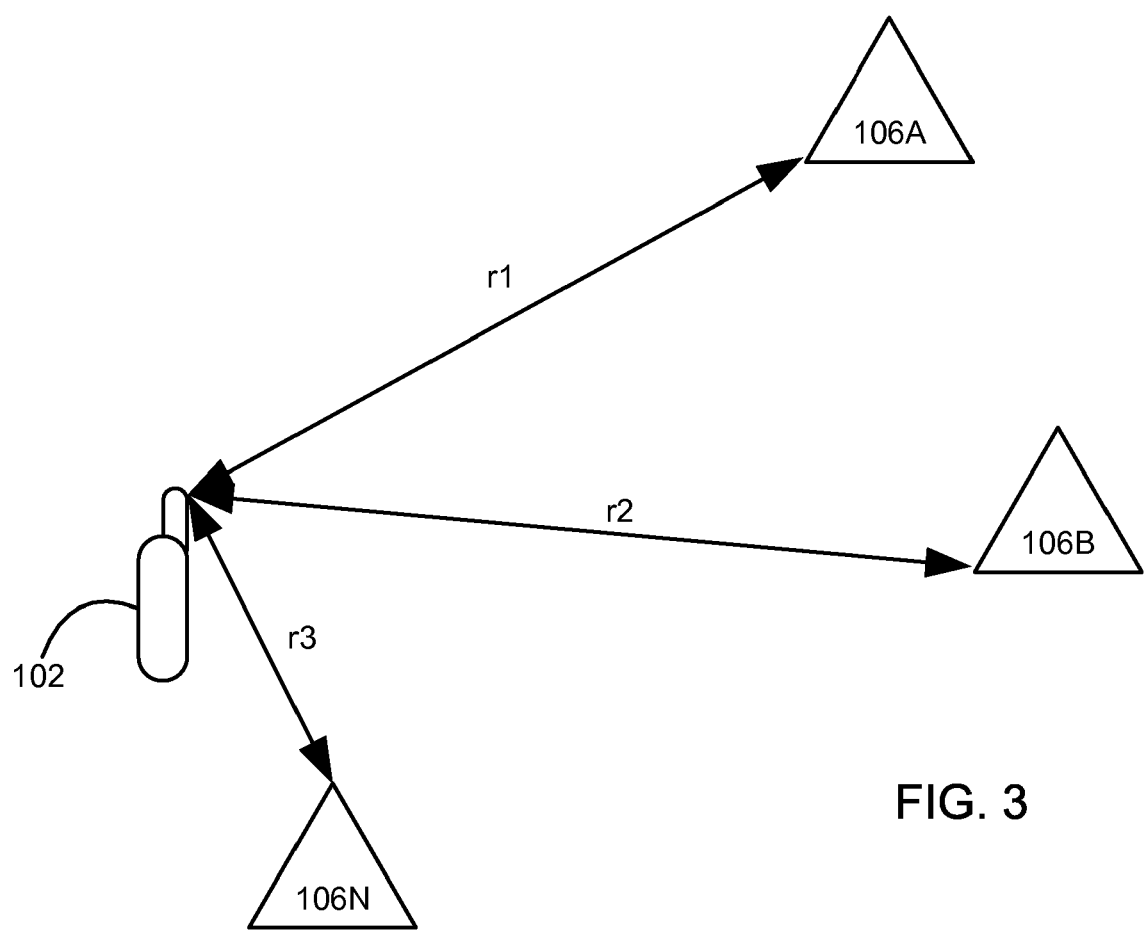
FIG. 3 depicts the geometry of a position determination using 3 DTV transmitters.

DTV location server 110 determines a position of the user terminal based on the pseudo-ranges and a location of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2). The range between user terminal 102 and DTV transmitter 106B is r2. DTV transmitter 106N is located at position (x3, y3). The range between user terminal 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and pr3 are given by $$pr1 = r1 + T \qquad (2)$$

$$pr2 = r2 + T \qquad (3)$$

$$pr3 = r3 + T \qquad (4)$$

The three ranges can be expressed as $$r1 = |X - X1| \qquad (5)$$

$$r2 = |X - X2| \qquad (6)$$

$$r3 = |X - X3| \qquad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. In an E911 application, the position of user terminal 102 is transmitted to E911 location server 116 for distribution to the proper authorities. In another application, the position is transmitted to user terminal 102.

In another implementation, user terminal 102 does not compute pseudo-ranges, but rather takes measurements of the DTV signals that are sufficient to compute pseudo-range, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock. User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

In another implementation, when only one or two DTV transmitters are available for position determination, GPS is used to augment the position determination.

Receiver Architecture

Figure 4:
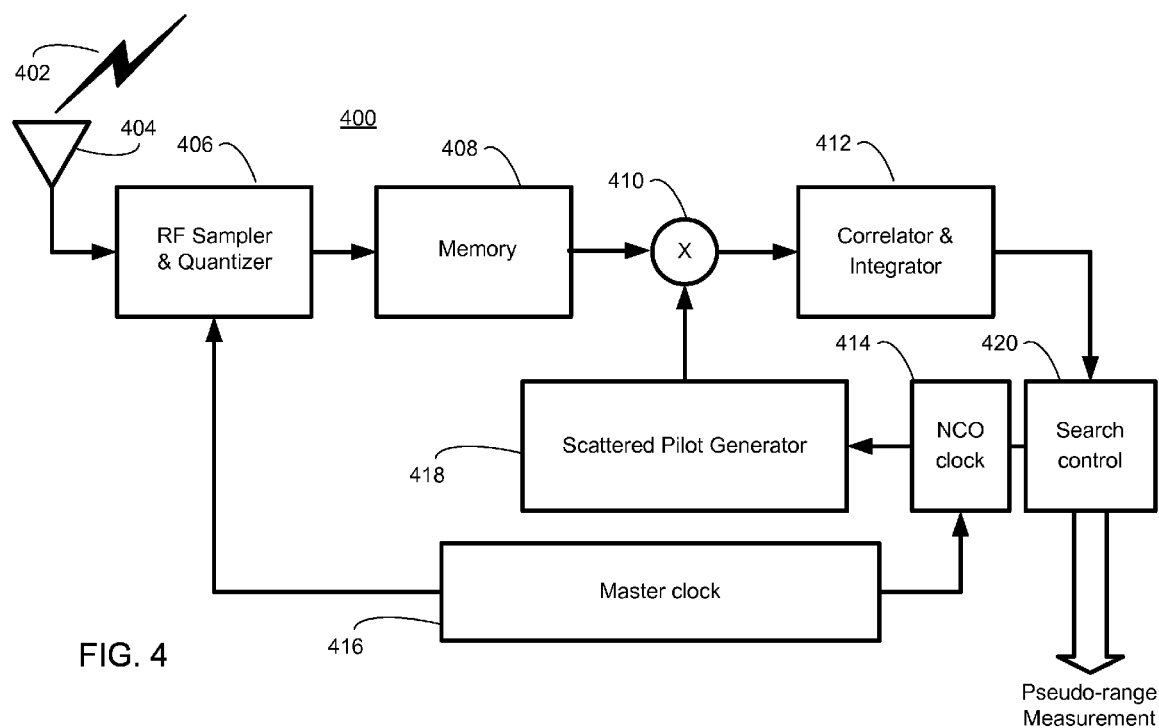
FIG. 4 depicts an implementation of a receiver for use in generating a pseudo-range measurement.

FIG. 4 depicts an implementation 400 of a receiver for use in generating a pseudo-range measurement. In one implementation, receiver 400 is implemented within user terminal 102. In another implementation, receiver 400 is implemented within monitor units 108.

RF Sampler & Quantizer 406 sequentially tunes antenna 404 to each of the digital TV signals 402 in the area, RF amplifies, and downconverts the signal to IF or baseband. The wideband filtered signal with its 8 MHz bandwidth is then sampled and quantized by RF sampler and quantizer 406. Then a segment of the quantized signal including 4 or more symbol intervals is stored in memory 408. Preferably a substantially longer segment of perhaps 0.1 seconds or more in duration is used to improve the averaging time and to improve noise performance.

Mixer 410 and correlator and integrator 412 sequentially correlate the stored time segment of the signal with various time offset versions of the reference scattered pilot carrier generated by scattered pilot generator 418. The reference signal is stepped in time by predetermined time steps to find the peak of the autocorrelation function. The step size is selected to produce a number of samples from the autocorrelation function that is sufficient to identify the autocorrelation peak. In one implementation, a large step size is initially used to obtain an estimate of the autocorrelation peak; then a smaller step size is used to refine that estimate. As shown below, implementations of the present invention use time samples spaced by $1/(1116*20{,}000) = 44$ ns. A correlator search control 420 searches for the major peak in the autocorrelation function and when found converts that measurement of pseudo-range to digitized form. Receiver 400 then sequentially performs the same set of functions on the other digital TV signals 402 available in the area from other DTV towers. It is not necessary to make multiple measurements from signals transmitted from the same DTV tower. The set of 3 or more pseudo-range measurements is then sent to DTV location server 110 by way of digital cellular or other wireless link.

Note that the position location operation at the subscriber handset or other device need only take place when the subscriber needs position location. For a subscriber walking slowly, in a slowly moving vehicle, or sitting in a building or field in an emergency, this location information need only be measured infrequently. Thus the battery or other power source can be very small.

Although receiver 400 implements a cross-correlator with a sum of digital signals it will be clear to one skilled in the relevant arts that alternate implementations can simplify the circuitry by using FFT/DFT (fast Fourier transform/direct Fourier transform) processing for example. Furthermore, although receiver 400 processes the samples at intermediate frequency (IF), other implementations process the samples in analog or digital form, and can operate at IF or at baseband. Still other implementations process the samples in the frequency domain.

Other signals within the DVB-T structure can also be used for position location. For example, a wide laning technique could be applied to the continuous pilot signals. However, such techniques as wide laning involve inherent resolution of cycle ambiguities Techniques for resolving such ambiguities are well-known in the art. One such technique is disclosed in M. Rabinowitz, Ph.D. Thesis: A Differential Carrier Phase Navigation System Combining GPS with Low Earth Orbit Satellites for Rapid Resolution of Integer Cycle Ambiguities, 2000, Department of Electrical Engineering, Stanford University, pages 59-76.

In receiver correlators and matched filters there are two important sources of receiver degradation. The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) clock 414 adjusts the clock frequency of the receiver to match that of the incoming received signal clock frequency and compensate for drifts and frequency offsets of the local oscillator in user terminal 102. Increased accuracy of the clock frequency permits longer integration times and better performance of the receiver correlator. The frequency control input of NCO clock 414 can be derived from master clock 416, a receiver symbol clock rate synchronizer, tracking of the DVB-T pilot carrier, or other clock rate discriminator techniques installed in NCO clock 414.

Position Location Enhancements

Figure 5:
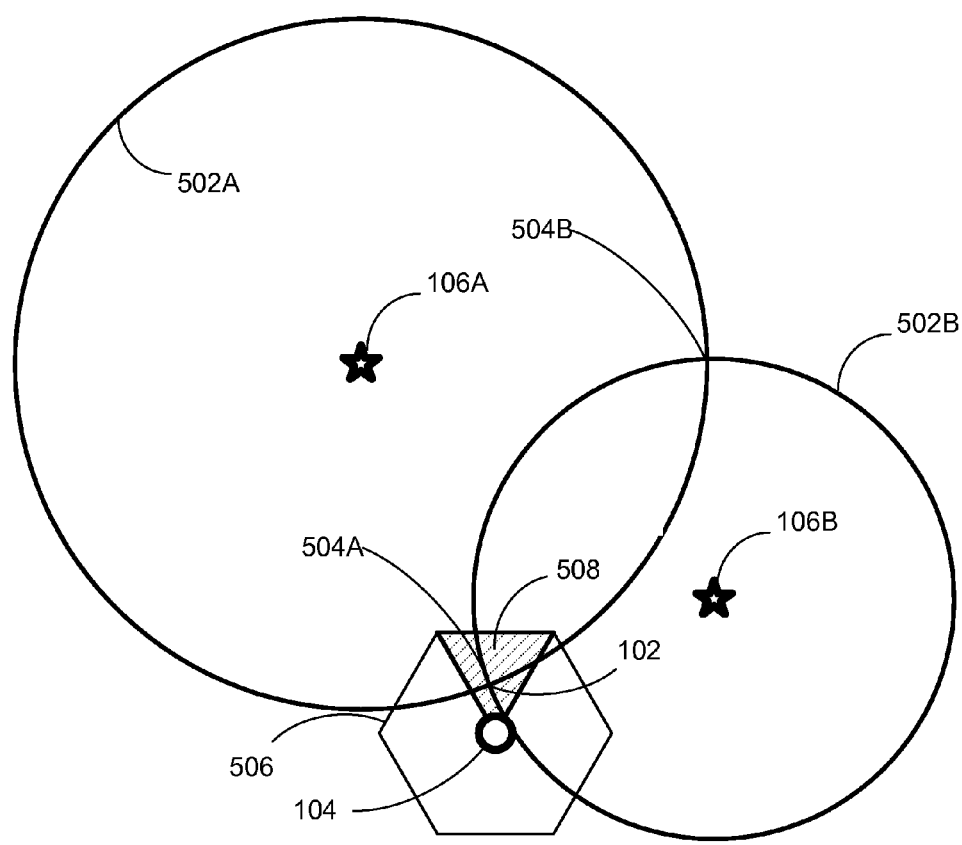
FIG. 5 illustrates a simple example of a position location calculation for a user terminal receiving DTV signals from two separate DTV antennas.

FIG. 5 illustrates a simple example of a position location calculation for a user terminal 102 receiving DTV signals from two separate DTV antennas 106A and 106B. Circles of constant range 502A and 502B are drawn about each of transmit antennas 106A and 106B, respectively. The position for a user terminal, including correction for the user terminal clock offset, is then at one of the intersections 504A and 504B of the two circles 502A and 502B. The ambiguity is resolved by noting that base station 104 can determine in which sector 508 of its footprint (that is, its coverage area) 506 the user terminal is located. Of course if there are more than two DTV transmitters in view, the ambiguity can be resolved by taking the intersection of three circles.

In one implementation, user terminal 102 can accept an input from a user that gives a general indication of the area, such as the name of the nearest city. In one implementation, user terminal 102 scans available DTV channels to assemble a fingerprint of the location. User terminal 102 compares this fingerprint to a stored table that matches known fingerprints with known locations to identify the current location of user terminal 102.

Figure 6:
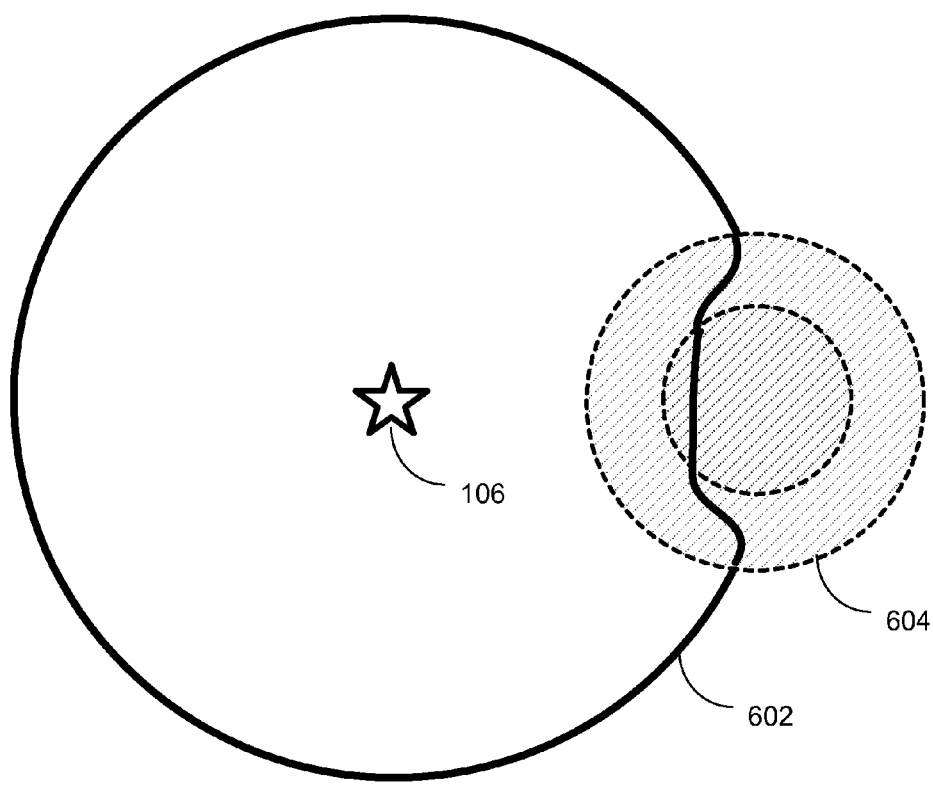
FIG. 6 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV antenna 106 the circles of constant range are distorted. FIG. 6 depicts the effects of a single hill 604 on a circle of constant range 602 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 6.

DVB-T Signal Description

The current DVB-T signal is described in a document entitled Digital Video Broadcasting (DVB); Framing structure, channel coding and modulation for digital terrestrial television, document number ETSI EN 300 744, V1.4.1 (2001-01). The DVB-T signal is a complex orthogonal frequency-division multiplexing (OFDM) signal that carries 188 Byte MPEG (Moving Picture Expert Group) packets using either 1512 or 6048 separate carriers. Most of these components carry the random-like data modulation of the video TV signals and is less useful for precision tracking at low signal levels. Note that for our purposes of position location, the user terminal may be in locations where the entire information content of the DVB-T signal is not available.

However the DVB-T DTV signal has embedded in it additional components that can be used through the techniques described herein for position location. For example, the DVB-T DTV signal includes two types of periodic broadband pilot signals. The signal contains both a set of continuous pilot carriers and a set of scattered pilot carriers. The DVB-T signals have two modes: 2K and 8K. Some of the parameters of these two modes are described in Table 1. While implementations of the invention are described with reference to the 8K signals, the techniques described also apply to the 2K signals.

TABLE 1

| Parameter | 2K mode | 8K mode |
|---|---|---|
| Number of carriers K | 1705 | 6817 |
| Symbol Duration | 224 microseconds | 896 microseconds |
| Carrier spacing | 4464 Hz | 1116 Hz |
| Total spacing of signal | 7.61 MHz | 7.61 MHz |

Continuous Pilot Signals

Figure 8:
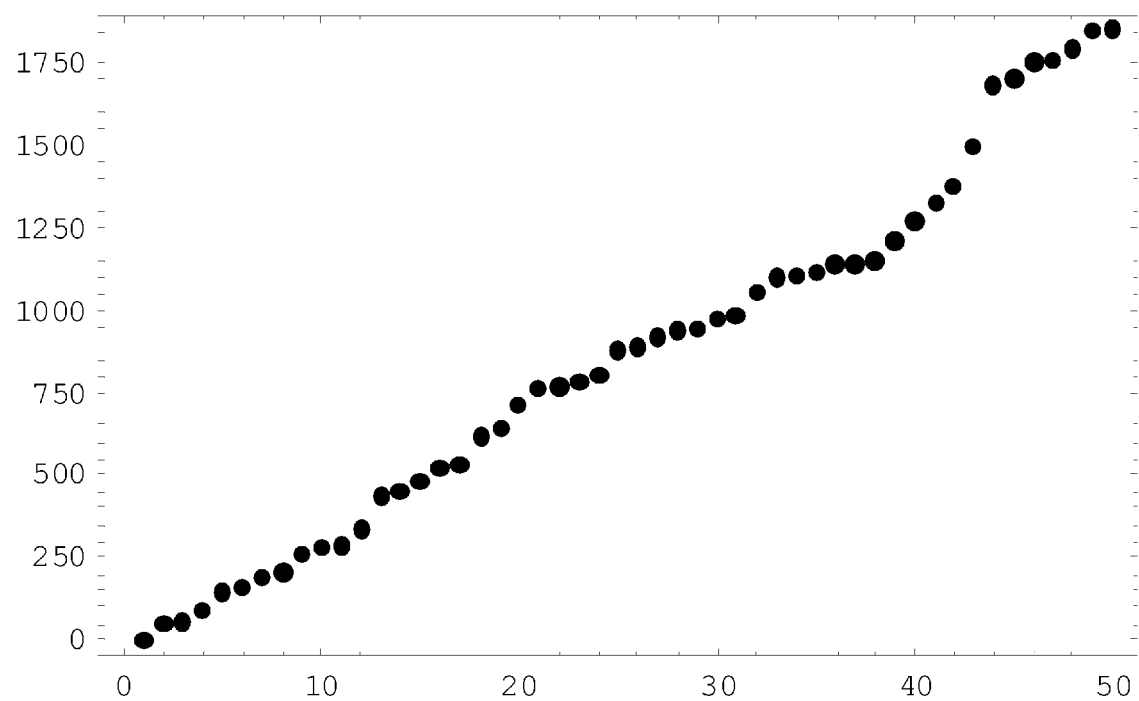
FIG. 8 depicts the first 50 carriers of the continuous pilot carriers.

The DVB-T continuous pilot signals in the 8K mode are a set of 177 carriers each having a constant reference binary ±1 amplitude selected by a PN sequence described below. The carriers are spaced by 1116 Hz. The carrier numbers for the first 50 carrier frequencies are shown in FIG. 7. The frequency of a carrier can be found by taking the product of the carrier number and 1116 Hz. FIG. 8 depicts the first 50 carriers of the continuous pilot carriers. The vertical scale is the carrier number. The minimum frequency offset between any two continuous pilot carriers is 3×1116 Hz which determines the time ambiguity of these continuous carriers. This signal can be likened to a sidetone ranging signal commonly used in ranging measurements. However it differs in that the power is divided among 177 separate carriers. Instead however one can correlate the signal with a composite reference waveform of 177 carriers generated in FFT fashion. However this composite continuous pilot signal has a poor autocorrelation function with many significant spectral sidelobes as shown in FIG. 9.

Figure 9:
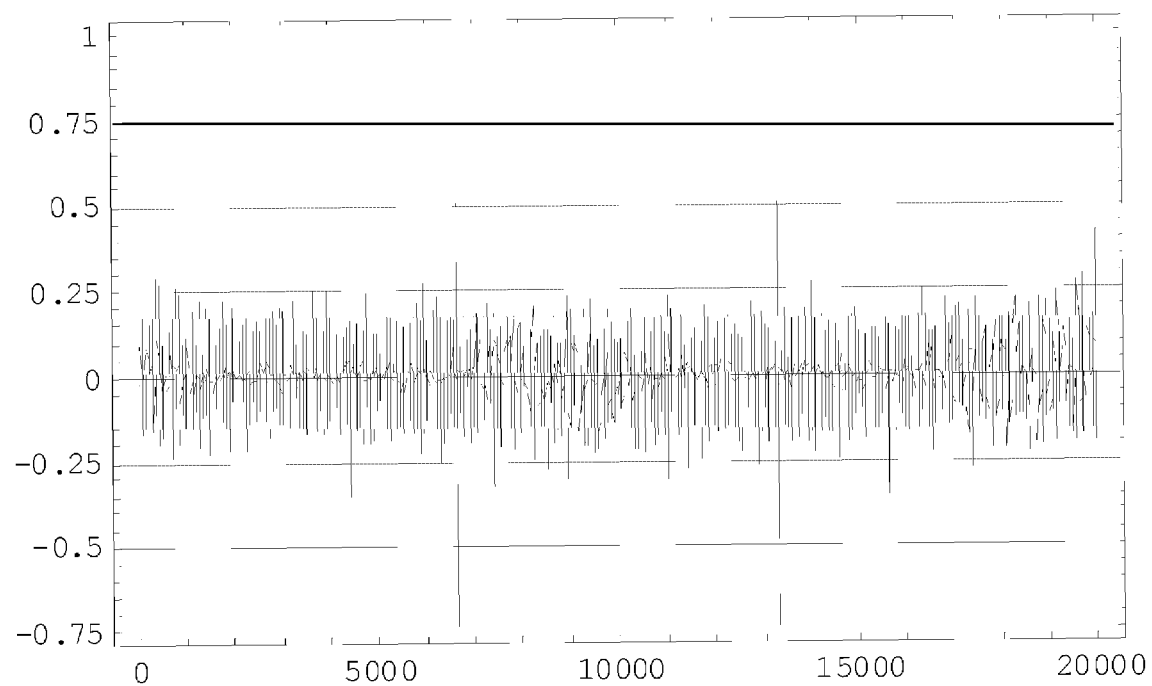
FIG. 9 depicts the autocorrelation function of the composite continuous pilot carriers with 177 parallel carriers in the 8K mode.

FIG. 9 depicts the autocorrelation function of the composite continuous pilot carriers with 177 parallel carriers in the 8K mode. The time increments are given on the horizontal scale in increments of 1/1116 s. The signal was sampled at a rate of 1116×20,000 samples/s. However as can be seen, the sidelobe levels of this signal are quite high with many peaks above 0.2 in magnitude.

Scattered Pilot Carriers

Figure 10:
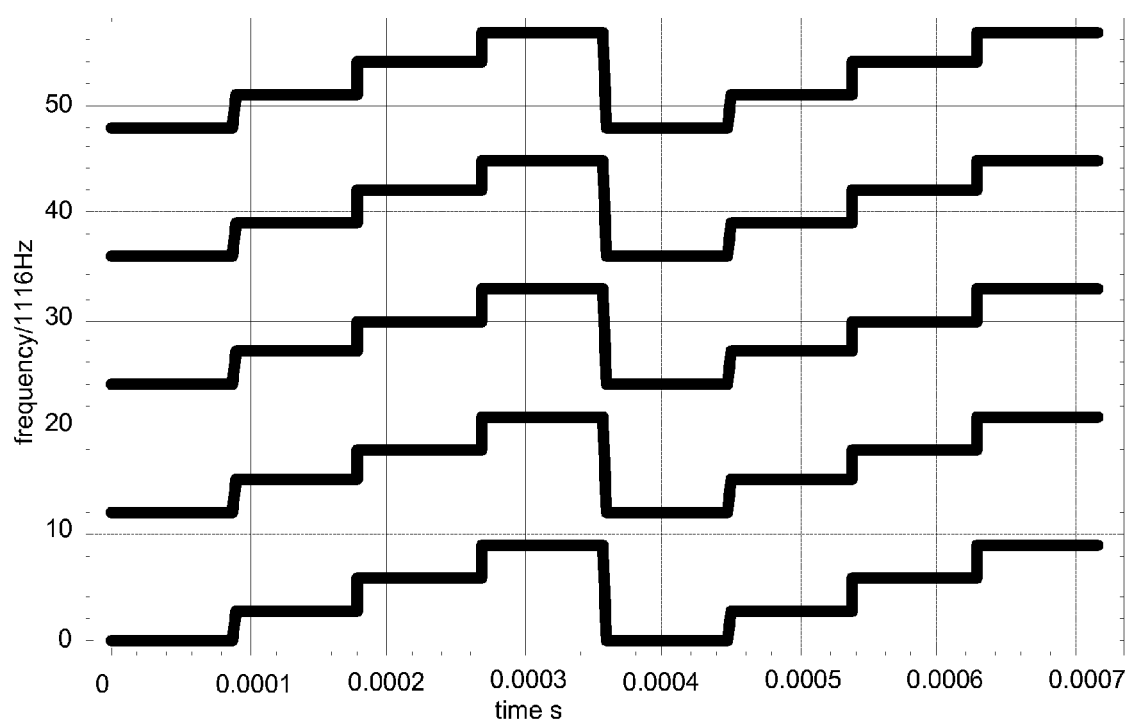
FIG. 10 depicts the frequency hopping of the first 5 scattered pilot carriers.

The 8K scattered pilot carriers are a set of 568 uniformly-spaced pilot carriers, each frequency hopped in a chirp-like fashion over 4 sequentially increasing frequencies. Thus each pilot begins at a frequency that is a multiple of 12×1116 Hz and remains at that frequency for the remainder of a symbol duration (1/1116 s). Then for the next symbol the pilot hops to a new frequency that is higher by 3×1116 Hz and has a new ±1 sign. The pilot repeats this increase for a total of 3 increments and then returns to its original frequency. The frequency hopping of the first 5 of these 568 scattered pilots is shown in FIG. 10. In each time increment the pilot carrier increases in frequency by 3 increments of 1116 Hz. Each of the 6816/12=568 scattered pilots is spaced by 12×1116=13,392 Hz. For the 2K mode there are 142 scattered pilots spaced by 53,568 Hz.

Each pilot carrier is given a ±1 sign amplitude as governed by a PN sequence of an 11 stage shift register with a polynomial $$x^{11}+x_2+1 \tag{8}$$

This PN sequence generates a sequence $$w[k]=\pm 1 \tag{9}$$

where k is the frequency of the individual pilot carrier as given above. Thus each time a pilot carrier changes to a new frequency it also changes its sign according to w[k].

Thus the frequency of each of the scattered pilots can be expressed in terms of t and p as $$k[t,p]=3 \operatorname{Mod}[n[t],4]+12p \tag{10}$$

where p is the number of the pilot and n[t] is the quantized time interval $$n[t]=\lfloor 1116t \rfloor \tag{11}$$

Each signal component for each of the 568 values of p is $$s[t,p]=w[k[t,p]]\sin[2\pi k[t,p]\times 1116t]] \tag{12}$$

The total scattered pilot signal is then the sum of 568 frequency hopped individual pilot carriers $$s_{total}[t] = \sum_{p=0}^{p=862} s[t, p] \tag{13}$$

Figure 11:
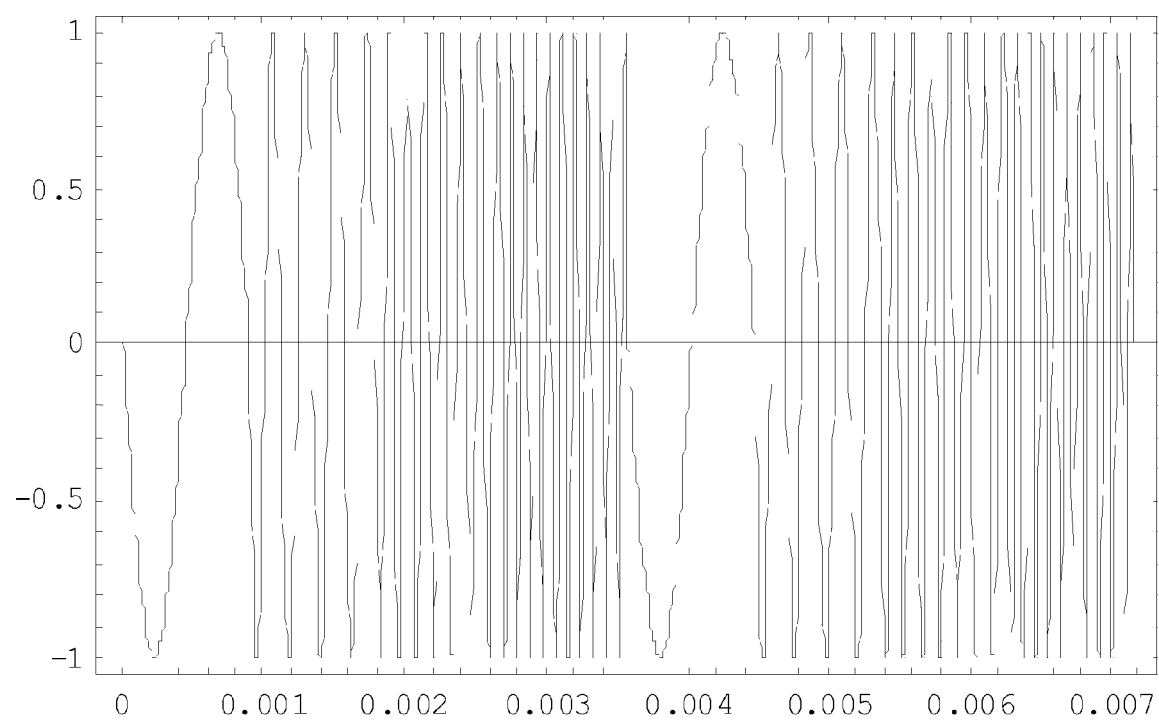
FIG. 11 depicts the waveform of one example carrier with no sign reversals over 8 time increments.

FIG. 11 depicts the waveform of one example carrier with no sign reversals over 8 time increments. Time is given in seconds. This scattered pilot carrier then has a total of 6816/12=568 carriers each of which hops sequentially over 4 frequencies for a total of 568×4=2272 total frequencies in a chirp-like fashion.

Figure 12:
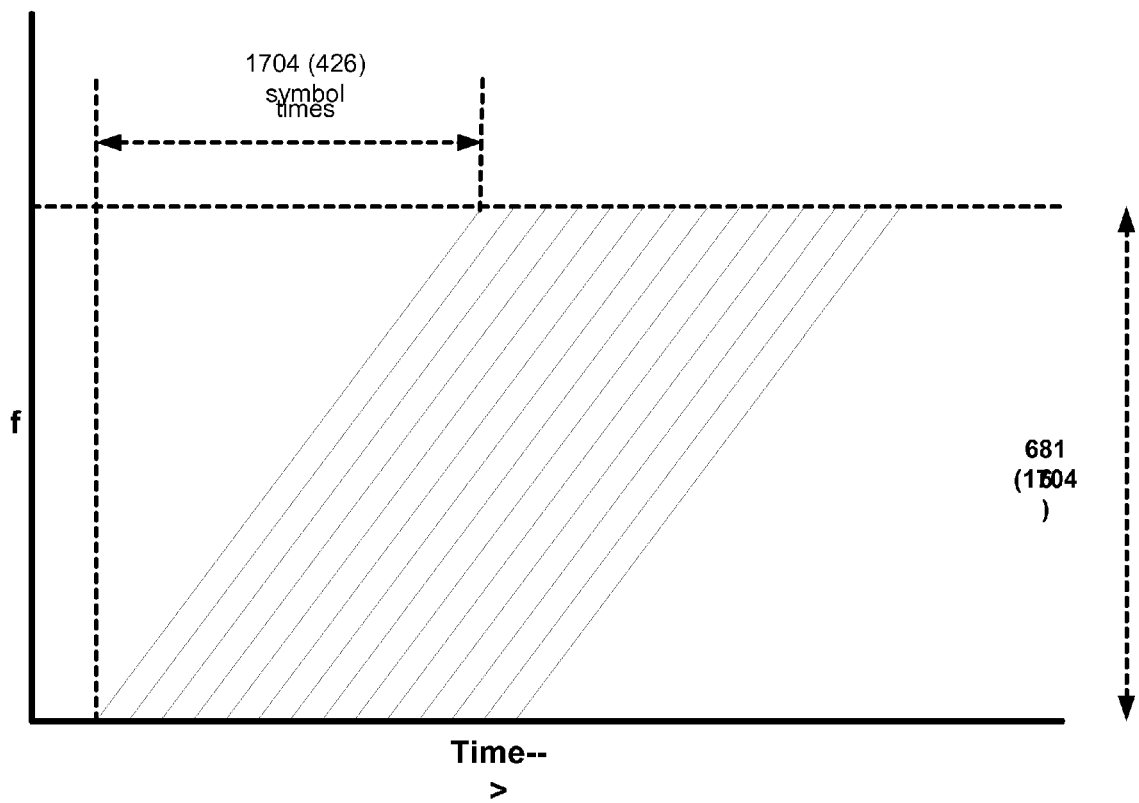
FIG. 12 is another view of the scattered pilot carriers.

FIG. 12 is another view of the scattered pilot carriers. In FIG. 12, the diagonal lines represent the 568 8K scattered pilot carriers chirping stepwise over the entire band of 7.61 MHz (6816 carrier numbers) in 6816/4=1704 symbol intervals. Thus at any one time instant there are 568 simultaneous chirp carriers. Each chirp carrier sweeps the entire 7.61 MHz frequency band in stepwise fashion. The numbers shown are for the 8K mode where the symbol duration is 896 microseconds (us). The corresponding numbers for the 2K mode are shown in parentheses where the symbol duration is 224 us.

Figure 13:
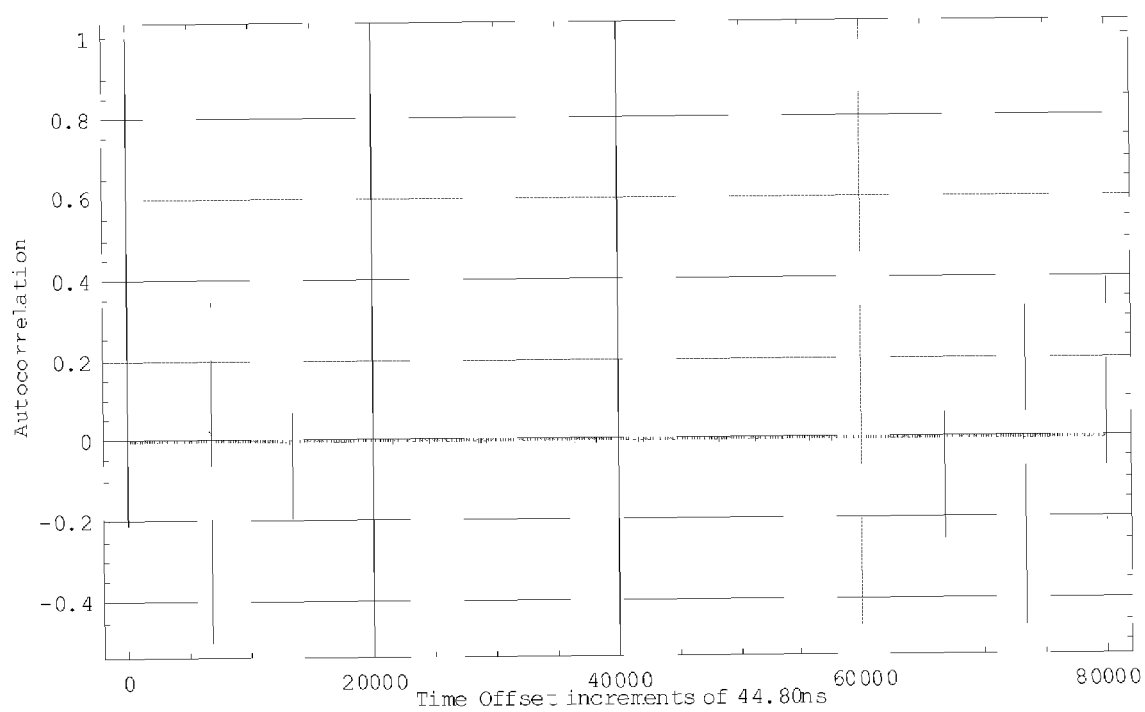
FIG. 13 depicts the autocorrelation function of the composite set of 568 frequency-hopped scattered pilot carriers.
Figure 14:
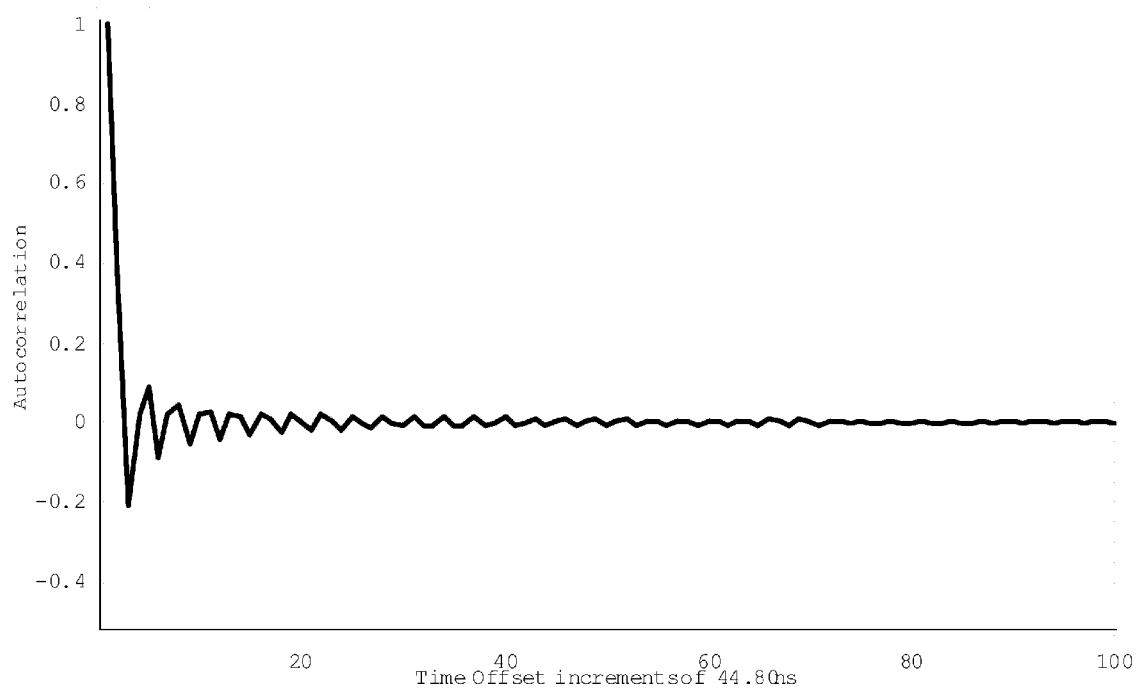
FIG. 14 shows the detailed fine structure of the scattered pilot composite signal observed over the first 100 time increments.
Figure 15:
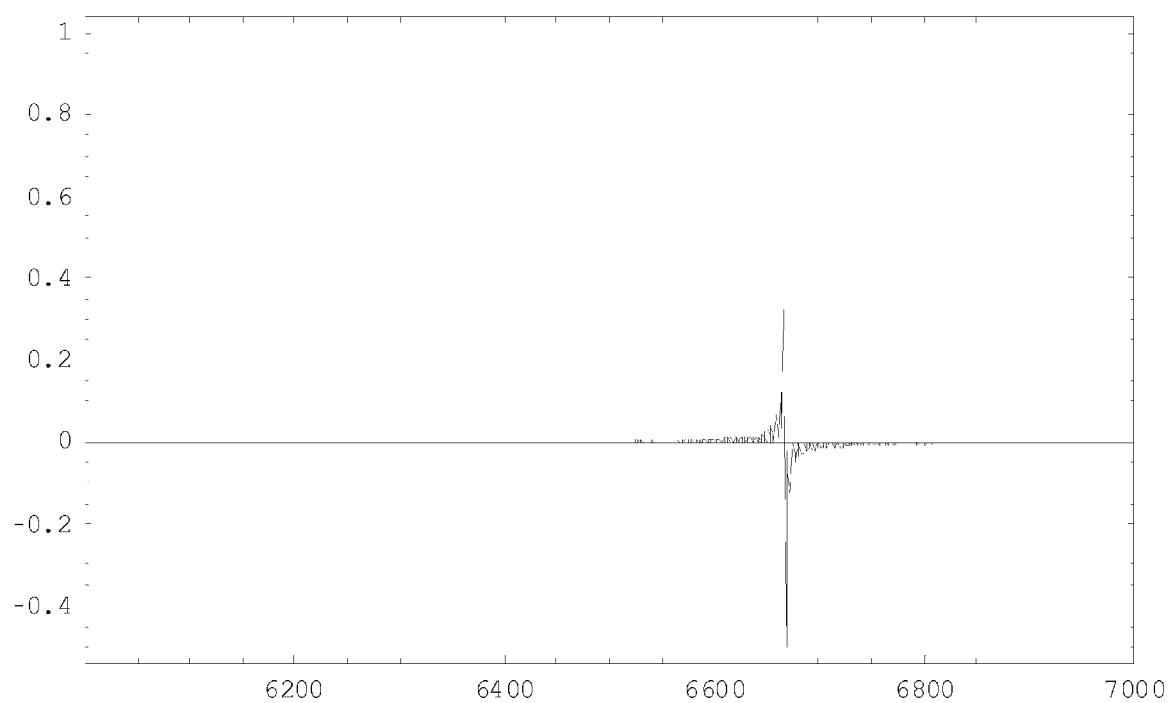
FIG. 15 shows the fine structure of the doublet sidelobe of the scattered pilot composite carrier.

This signal has a very good autocorrelation function as shown in FIGS. 13-15. FIG. 13 depicts the autocorrelation function of the composite set of 568 frequency-hopped scattered pilot carriers. The composite signal has been sampled at a rate 1116×20,000=22.32 MHz. Thus there are 80,000 samples over the 4-symbol time increment period of the scattered pilot carriers. Note the very low sidelobe cross-correlation of this signal with the exception of the 4 sidelobes which as shown below are doublets. FIGS. 14 and 15 show the detail over much smaller time increments.

FIG. 14 shows the detailed fine structure of the scattered pilot composite signal observed over the first 100 time increments. Note the low levels of the autocorrelation function outside of the peak.

FIG. 15 shows the fine structure of the doublet sidelobe of the scattered pilot composite carrier. Note again the very small values of the autocorrelation function of this signal outside of the main peak and the 4 sidelobe peaks.

Monitor Units

Figure 16:
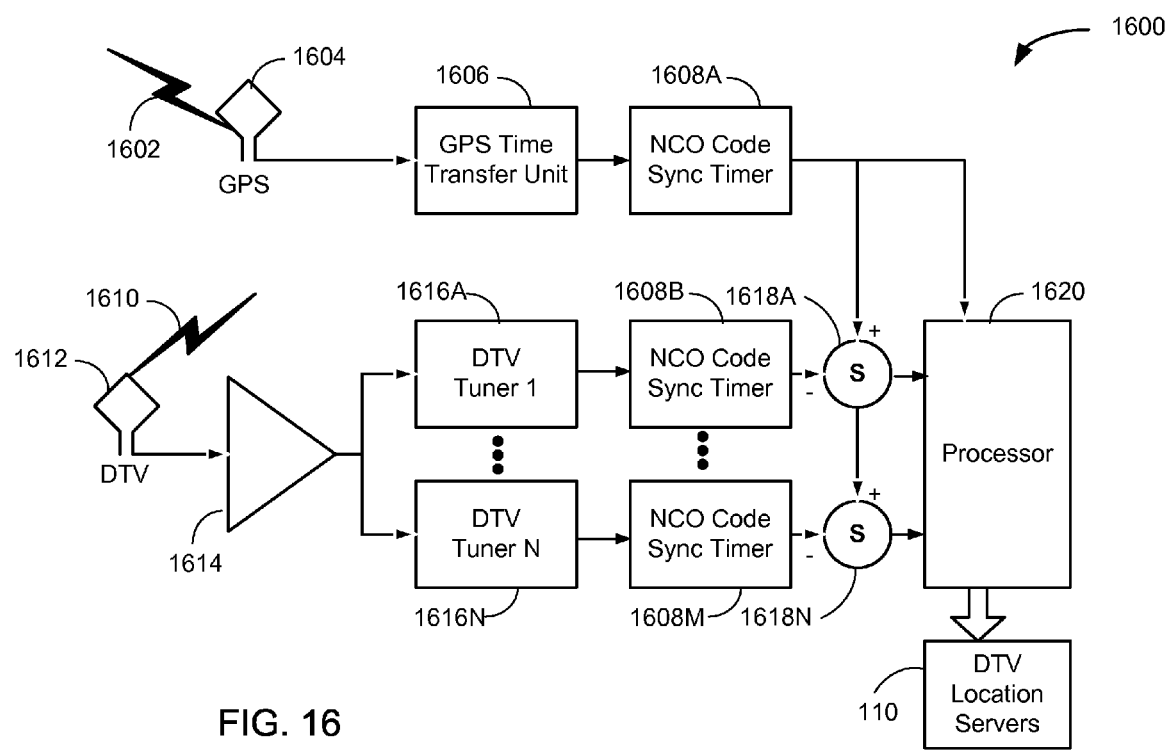
FIG. 16 depicts an implementation of a monitor unit.

FIG. 16 depicts an implementation 1600 of monitor unit 108. An antenna 1604 receives GPS signals 1602. A GPS time transfer unit 1606 develops a master clock signal based on the GPS signals. In order to determine the offset of the DTV transmitter clocks, a NCO (numerically controlled oscillator) code synchronization timer 1608A develops a master synchronization signal based on the master clock signal. The master synchronization signal can include the DVB-T scattered pilot carriers. In one implementation, the NCO field synchronization timers 1608A in all of the monitor units 108 are synchronized to a base date and time. In implementations where a single monitor unit 108 receives DTV signals from all of the same DTV transmitters that user terminal 102 does, it is not necessary to synchronize that monitor unit 108 with any other monitor unit for the purposes of determining the position of user terminal 102. Such synchronization is also unnecessary if all of the monitor stations 108, or all of the DTV transmitters, are synchronized to a common clock.

A DTV antenna 1612 receives a plurality of DTV signals 1610. In another implementation, multiple DTV antennas are used. An amplifier 1614 amplifies the DTV signals. One or more DTV tuners 1616A through 1616N each tunes to a DTV channel in the received DTV signals to produce a DTV channel signal. Each of a plurality of NCO code synchronization timers 1608B through 1608M receives one of the DTV channel signals. Each of NCO code synchronization timers 1608B through 1608M extracts a channel synchronization signal from a DTV channel signal. The channel synchronization signal can include the DVB-T scattered pilot carriers. In one implementation, the continuous pilot signal and symbol clock signal within the DVB-T signal are used as acquisition aids.

Each of a plurality of summers 1618A through 1618N generates a clock offset between the master synchronization signal and one of the channel synchronization signals. Processor 1620 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay, such as in E911 applications, a simple approach is to use a software receiver, which samples a sequence of the filtered signal, and then processes the sample in firmware on a DSP.

Figure 17:
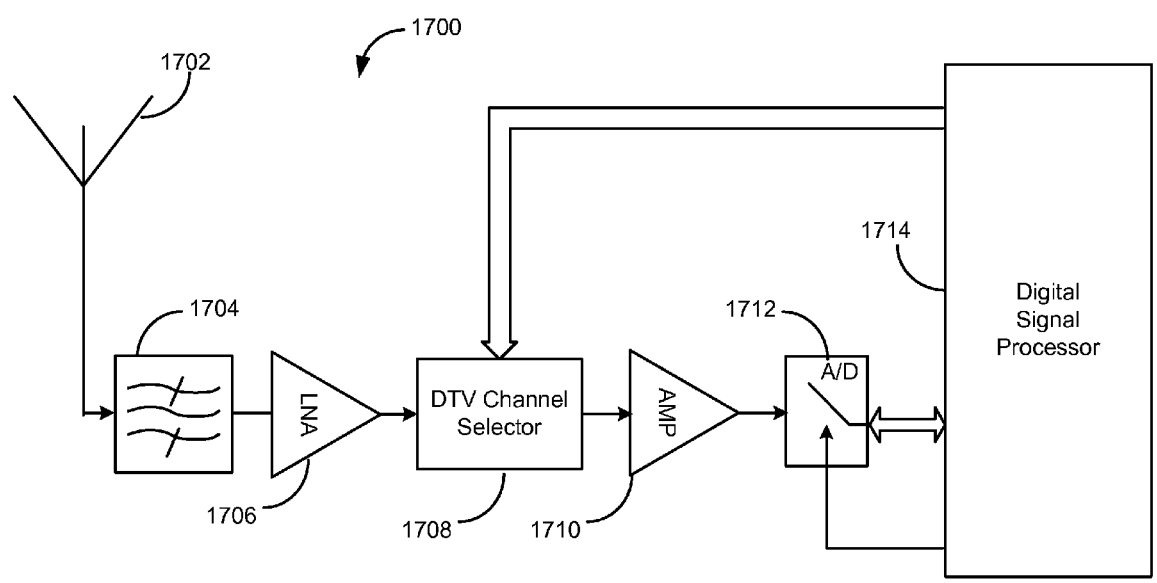
FIG. 17 illustrates one implementation for tracking in software.

FIG. 17 illustrates one implementation 1700 for tracking in software. An antenna 1702 receives a DTV signal. Antenna 1702 can be a magnetic dipole or any other type of antenna capable of receiving DTV signals. A bandpass filter 1704 passes the entire DTV signal spectrum to an LNA 1706. In one implementation, filter 1704 is a tunable bandpass filter that passes the spectrum for a particular DTV channel under the control of a digital signal processor (DSP) 1714.

A low-noise amplifier (LNA) 1706 amplifies and passes the selected signal to a DTV channel selector 1708. DTV channel selector 1708 selects a particular DTV channel under the control of DSP 1714, and filters and downconverts the selected channel signal from UHF (ultra-high frequency) to IF (intermediate frequency) according to conventional methods. An amplifier (AMP) 1710 amplifies the selected IF channel signal. An analog-to-digital converter and sampler (A/D) 1712 produces digital samples of the DTV channel signal s(t) and passes these samples to DSP 1714.

Now the processing of the DTV channel signal by DSP 1714 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max}=0$

Create a complex code signal $s_{code}(t)=C_i(t)+jC_q(t)$ where $C_i$ is the function describing the in-phase baseband signal and $C_q$ is the function describing the quadrature baseband signal.

Compute $F\{s_{code}\}^*$ where F is the Fourier transform operator, and $*$ is the conjugate operator.

For $\omega=\omega_{in}-\omega_{offset}$ to $\omega_{in}+\omega_{offset}$ step $$\frac{\pi}{2T_i}$$

Create a complex mixing signal $s_{mix}(t)=\cos(\omega t)+j\sin(\omega t), t=[0\ldots T_i]$ Combine the incident signal s(t) and the mixing signal $s_{mix}(t)$ $s_{comb}(t)=s(t)s_{mix}(t)$ Compute the correlation function $R(\tau)=F^{-1}\{F(s_{code})F(s_{comb})\}$ If $\max_\tau|R(\tau)|>R_{max}$, $R_{max}\leftarrow\max_\tau|R(\tau)|$, $R_{store}(\tau)=R(\tau)$ Next $\omega$ Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist rate $$\frac{2\pi}{T_i}.$$

The time offset $\tau$ that produces the maximum correlation output is used as the pseudo-range.

Alternative Embodiments

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example, while various signals and signal processing techniques are discussed herein in analog form, digital implementations will be apparent to one skilled in the relevant art after reading this description.

For example, although one method for tracking the DVB-T signal is described, it should be clear that there are several methods of tracking these signals using various forms of conventional delay lock loops and through the use of various types of matched filters.

While implementations of the invention are discussed with reference to the 8 MHz signal, implementations can be used with signals of other bandwidths. Further, implementations of the invention can employ a subset of the bandwidth of the DVB-T signal. For example, an implementation of the invention can achieve satisfactory results using only 6 MHz of an 8 MHz DVB-T signal. Implementations of the invention can be extended to use future enhancements to the DVB-T signal.

Implementations of the present invention exploit the low duty factor of the DTV signal in many ways. For example, one implementation employs a time-gated delay-lock loop (DLL) such as that disclosed in J. J. Spilker, Jr., Digital Communications by Satellite, Prentice-Hall, Englewood Cliffs N.J., 1977, Chapter 18-6. Other implementations employ variations of the DLL, including coherent, noncoherent, and quasi-coherent DLLs, such as those disclosed in J. J. Spilker, Jr., Digital Communications by Satellite, Prentice-Hall, Englewood Cliffs N.J., 1977, Chapter 18 and B. Parkinson and J. Spilker, Jr., Global Positioning System-Theory and Applications, AIAA, Washington, D.C., 1996, Vol. 1, Chapter 17, Fundamentals of Signal Tracking Theory by J. Spilker, Jr. Other implementations employ various types of matched filters, such as a recirculating matched filter.

In some implementations, DTV location server 110 employs redundant signals available at the system level, such as pseudo-ranges available from the DTV transmitters, making additional checks to validate each DTV channel and pseudo-range, and to identify DTV channels that are erroneous. One such technique is conventional receiver autonomous integrity monitoring (RAIM).

Accordingly, other embodiments are within the scope of the following claims.

What is claimed is:

1. An apparatus to determine the position of a user terminal, comprising:
    a receiver to receive, at the user terminal, a wireless orthogonal frequency-division multiplexing (OFDM) signal comprising a scattered pilot signal; and
    a processor to determine a pseudo-range based on the scattered pilot signal;
    wherein a position of the user terminal is determined based on the pseudo-range and a location of a transmitter of the OFDM signal.

2. The apparatus of claim 1, wherein the OFDM signal comprises:
    a Digital Video Broadcasting (DVB) signal.

3. The apparatus of claim 2, wherein the DVB signal comprises at least one of:
    a DVB-Terrestrial (DVB-T) signal; and
    a DVB-Handheld (DVB-H) signal.

4. The apparatus of claim 1:
    wherein the processor determines the position of the user terminal based on the pseudo-range and the location of the transmitter of the OFDM signal.

5. The apparatus of claim 4:
    wherein, to determine the position of the user terminal, the processor
        determines an offset between a local time reference in the user terminal and a master time reference, and
        determines the position of the user terminal based on the wireless OFDM signal, the location of the transmitter of the OFDM signal, and the offset.

6. The apparatus of claim 5:
    wherein the processor determines a subsequent position of the user terminal using the offset.

7. An apparatus to determine the position of a user terminal, comprising:
    receiver means for receiving, at the user terminal, a wireless orthogonal frequency-division multiplexing (OFDM) signal comprising a scattered pilot signal; and
    processor means for determining a pseudo-range based on the scattered pilot signal;
    wherein a position of the user terminal is determined based on the pseudo-range and a location of a transmitter of the OFDM signal.

8. The apparatus of claim 7, wherein the OFDM signal comprises:
    a Digital Video Broadcasting (DVB) signal.

9. The apparatus of claim 8, wherein the DVB signal comprises at least one of:
    a DVB-Terrestrial (DVB-T) signal; and
    a DVB-Handheld (DVB-H) signal.

10. The apparatus of claim 7:
    wherein the processor means determines the position of the user terminal based on the pseudo-range and the location of the transmitter of the OFDM signal.

11. The apparatus of claim 10:
    wherein, to determine the position of the user terminal, the processor means
        determines an offset between a local time reference in the user terminal and a master time reference, and
        determines the position of the user terminal based on the wireless OFDM signal, the location of the transmitter of the OFDM signal, and the offset.

12. The apparatus of claim 11:
    wherein the processor means determines a subsequent position of the user terminal using the offset.

13. A method for determining the position of a user terminal, comprising:
    receiving, at the user terminal, a wireless orthogonal frequency-division multiplexing (OFDM) signal comprising a scattered pilot signal; and
    determining a pseudo-range based on the scattered pilot signal;
    wherein a position of the user terminal is determined based on the pseudo-range and a location of a transmitter of the OFDM signal.

14. The method of claim 13, wherein the OFDM signal comprises:
  a Digital Video Broadcasting (DVB) signal.

15. The method of claim 14, wherein the DVB signal comprises at least one of:
  a DVB-Terrestrial (DVB-T) signal; and
  a DVB-Handheld (DVB-H) signal.

16. The method of claim 13, further comprising:
  determining an offset between a local time reference in the user terminal and a master time reference; and
  determining the position of the user terminal based on the wireless OFDM signal, the location of the transmitter of the OFDM signal, and the offset.

17. The method of claim 16, further comprising:
  determining a subsequent position of the user terminal using the offset.

18. Computer-readable media embodying instructions executable by a computer to perform a method for determining the position of a user terminal, the method comprising:
  receiving, at the user terminal, a wireless orthogonal frequency-division multiplexing (OFDM) signal comprising a scattered pilot signal; and
  determining a pseudo-range based on the scattered pilot signal;
  wherein a position of the user terminal is determined based on the pseudo-range and a location of a transmitter of the OFDM signal.

19. The computer-readable media of claim 18, wherein the OFDM signal comprises:
  a Digital Video Broadcasting (DVB) signal.

20. The computer-readable media of claim 19, wherein the DVB signal comprises at least one of:
  a DVB-Terrestrial (DVB-T) signal; and
  a DVB-Handheld (DVB-H) signal.

21. The computer-readable media of claim 18, wherein the method further comprises:
  determining an offset between a local time reference in the user terminal and a master time reference; and
  determining the position of the user terminal based on the wireless OFDM signal, the location of the transmitter of the OFDM signal, and the offset.

22. The computer-readable media of claim 21, wherein the method further comprises:
  determining a subsequent position of the user terminal using the offset.

\* \* \* \* \*